US012749861B2

(12) United States Patent
Davis et al.

(10) Patent No.: US 12,749,861 B2
(45) Date of Patent: Sep. 29, 2026

(54) SYSTEM AND METHOD FOR DISCONNECTING APPENDAGES FROM THE TRAILER PORTION OF AN AUTONOMOUS VEHICLE

(71) Applicant: Torc Robotics, Inc., Blacksburg, VA (US)

(72) Inventors: William Gray Davis, Austin, TX (US); Joseph R. Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 0 days.

(21) Appl. No.: 18/986,178

(22) Filed: Dec. 18, 2024

(65) Prior Publication Data

US 2026/0171742 A1 Jun. 18, 2026

(51) Int. Cl.

| | |
|---|---|
| ***B60D 1/36*** | (2006.01) |
| ***B60D 1/64*** | (2006.01) |
| ***H01R 43/26*** | (2006.01) |

(52) U.S. Cl.

CPC ............... *H01R 43/26* (2013.01); *B60D 1/64* (2013.01); *H01R 2201/26* (2013.01)

(58) Field of Classification Search

CPC ...... H01R 43/26; H01R 2201/26; B60D 1/64; B60D 1/065; B60D 1/36; B60D 1/38; B60D 1/40; B62D 53/125

See application file for complete search history.

(56) References Cited

U.S. PATENT DOCUMENTS

| | | | | |
|---|---|---|---|---|
| 3,840,276 | A | 10/1974 | Jubenville | |
| 4,223,766 | A | 9/1980 | Huetsch et al. | |
| 4,239,252 | A | 12/1980 | Huetsch et al. | |
| 4,784,610 | A * | 11/1988 | Stuart | H01R 13/633 174/67 |
| 5,013,059 | A | 5/1991 | Goettker | |
| 6,494,477 | B1 | 12/2002 | Parker | |
| 6,905,132 | B2 | 6/2005 | Pierce | |
| 8,047,559 | B2 | 11/2011 | Harlin | |
| 8,890,670 | B2 | 11/2014 | Brey et al. | |
| 9,834,049 | B2 | 12/2017 | Strand | |
| 9,966,713 | B1 * | 5/2018 | Shaeffer | H01R 24/86 |
| 11,179,982 | B2 | 11/2021 | Webster et al. | |
| 11,298,993 | B2 | 4/2022 | Abdel-Rahman et al. | |
| 11,608,127 | B1 | 3/2023 | Vega et al. | |
| 2021/0316761 | A1 | 10/2021 | Torrie et al. | |
| 2022/0372793 | A1 | 11/2022 | Parker et al. | |
| 2023/0069630 | A1 | 3/2023 | Peacemaker et al. | |

* cited by examiner

*Primary Examiner* — Jun S Yoo

(74) *Attorney, Agent, or Firm* — McCarter & English, LLP

(57) ABSTRACT

An appendage disconnection system for an autonomous vehicle includes a plug coupled to a cable, a sleeve encasing the plug, and a plug position control mechanism. The plug is removably attached to a trailer and the plug is attached to a tractor portion of the autonomous vehicle, the plug moveable between a connected position and a disconnected position. The position control mechanism is housed within a body of the plug and is adapted to impede and enable movement of the plug relative to the sleeve.

17 Claims, 9 Drawing Sheets

SYSTEM AND METHOD FOR DISCONNECTING APPENDAGES FROM THE TRAILER PORTION OF AN AUTONOMOUS VEHICLE

TECHNICAL FIELD

The present disclosure relates generally to the field of transportation logistics for autonomous vehicles, such as tractor-trailers. More specifically, the present disclosure relates to systems and methods for automatically disconnecting appendages between a trailer portion and a tractor portion, for example an electric plug or an air hose.

BACKGROUND

Some autonomous vehicles include multiple bodies, such as autonomous trucks with a tractor portion and a trailer portion. The trailer portion may be coupled or linked to the tractor portion. Certain appendages are connected between the tractor portion and a wall of the trailer portion. The appendages may comprise one or more electric cables and/or one or more air hoses that extend between the tractor and the trailer. Electric cable appendages used throughout the tractor-trailer industry do not include a mechanism that automates their disconnection from the trailer. Once plugged into a receptacle on the trailer, conventional electric cables must be manually disconnected from the trailer by an operator, requiring an operator to remove the electric plug from the receptacle.

When the autonomous truck is operational (e.g., driving or moving along a roadway), the autonomous truck may experience an emergency, such as a fire located in the trailer portion, or tractor portion. During such an emergency, it is critical that the appendages such as air hoses and electric cables be quickly disconnected from the trailer so that the tractor portion can be effectively separated from the trailer portion. Because the current systems and methods for disconnecting the air hoses, electric cables and other appendages from the trailer portion are highly manual, when an emergency occurs, the tractor-trailer operator must leave the cab to disconnect the hoses and cables. In an emergency, it may be unsafe for the operator to leave the tractor portion to make the necessary disconnections. Also, there may not be sufficient time to leave the cab to safely make the manual disconnections. As a result, frequently the appendages are ripped out of the trailer portion when the trailer portion and tractor portion are separated during the emergency. When the appendages are ripped out from the trailer portion, brakes on the trailer portion and tractor portion lock, thereby preventing the tractor portion from traveling a safe distance from the trailer portion. Accordingly, a system including sensors—to monitor for emergency situations—and automation the disconnection of the appendages from a trailer is required.

Additionally, the system can improve the operation of trailer use even in non-emergency situations. For example, in hub-deliveries the trailer portion may be disconnected from the vehicle without operator intervention; thereby providing time- and labor-saving procedures. Since some trailers may be universal to both autonomous and manual tractors, the system can be a self-contained unit, i.e. integrated in the appendages, that does not require customization to work with a given trailer portion.

Accordingly, there exists a need for a system and a method for automating detachment of appendages extending between a tractor portion and a trailer portion that address the foregoing and other issues. These and other needs are met by the exemplary system for automatically detaching appendages, such as electric cable(s) discussed herein.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

BRIEF DESCRIPTION

According to one aspect of the disclosure, a system is disclosed for disconnecting an appendage, for example a cable, from an autonomous vehicle, wherein the autonomous vehicle is selectively coupled to a trailer. The system includes a plug located along the cable, the plug being connected to the trailer; a sleeve encasing the plug, the plug being movable relative to the sleeve between a connected position where the plug is connected to the trailer and a disconnected position where the plug is disconnected from the trailer; and a plug position control mechanism configured to impede movement of the plug to maintain the plug in the connected position and to enable movement of the plug to the disconnected position.

In some aspects, the system may include the sleeve being slidable relative to the plug.

In some aspects, the system may include the plug having a body and further comprising at least one pocket, each at least one pocket being located within the plug body, and the sleeve further comprising an inner wall and at least one plate. Each at least one plate extends from the inner wall and is located in a corresponding at least one pocket, each at least one plate being slidable within the associated pocket.

In some aspects, the system may include the plug comprising two pockets. In some aspects, the system may include the pockets being located along opposite sides of the plug. In some aspects, the system may include the plug body being substantially cylindrical and comprises a diameter, the pockets being diametrically opposed.

In some aspects, the system may include the plug further comprising at least one notch, each at least one notch being located along an exterior surface of the plug body and adjacent a corresponding at least one pocket. In some aspects, the system may include the plug comprises a first notch and second notch and a first pocket and a second pocket, the first notch and first pocket forming a first notch and pocket pair and the second notch and second pocket forming a second notch and pocket pair.

In some aspects, the system may include the sleeve comprising two plates. In some aspects, the system may include the plates being located along opposite sides of the sleeve.

In some aspects, the system may include the sleeve further comprising at least one post extending from a corresponding at least one plates.

In some aspects, the system may include the plug position control mechanism being configured to maintain relative positions of the sleeve and plug substantially constant when the plug is connected to the trailer, and wherein the plug position control mechanism is configured to enable a relative, opposed motion between the sleeve and plug when the plug is disconnected from the trailer. In some aspects, the system may include the plug includes at least one plug position control mechanism housed in a corresponding at least one pocket and is operably coupled to a corresponding at least one plate located in the corresponding at least one pocket. In some aspects, the system may include the plug position control mechanism further comprising a biasing mechanism and a release mechanism configured to release the biasing mechanism to enable movement of the plug.

In some aspects, the system may include the release mechanism is a latch.

According to another aspect of the disclosure, a system for disconnecting an appendage, for example a cable, from an autonomous vehicle, wherein the autonomous vehicle is selectively coupled to a trailer. The system includes a connecting member; a sleeve encasing the connecting member, the connecting member and sleeve being movable relative to each other; and a position control mechanism configured to impede relative movement between the sleeve and the connecting member to maintain the connecting member and sleeve in a first relative orientation, and to enable relative movement of the connecting member and sleeve in opposite directions to assume a second orientation.

In some aspects, the system may include the connecting member is a plug.

In some aspects, the system may include the connecting member having a body and further comprising at least one pocket, each of the at least one pockets being located along the connecting member body, and the sleeve further comprising an inner wall and at least one plate. Each of the at least one plates extends from the inner wall and is located in a corresponding at least one pocket, each of the at least one plates being slidable within the associated pocket.

In some aspects, the system may include the position control mechanism further comprises a biasing mechanism and a release mechanism configured to release the biasing mechanism to enable movement of the connecting member and sleeve. In some aspects, the system may include the position control mechanism being configured to maintain relative positions of the sleeve and connecting member substantially constant, and to enable a relative, opposed motion between the sleeve and the connecting member.

In some aspects, the system may include the connecting member including at least one position control mechanism housed in a corresponding at least one pockets and is operably coupled to a corresponding at least one plate located in the corresponding at least one pocket.

According to aspect of the disclosure, a method for disconnecting an appendage, for example a cable, from an autonomous vehicle, wherein the autonomous vehicle is selectively coupled to a trailer. The method of disconnecting a connecting system from an trailer where the connecting system comprises a plug, a sleeve encasing the plug, the plug and sleeve being movable relative to each other, and a plug position control mechanism configured to impede relative movement between the sleeve and the plug to maintain the plug and sleeve in a first relative orientation where the plug is connected to the trailer, and to enable relative movement of the plug and sleeve in opposite directions to assume a second relative orientation where the plug is disconnected from the trailer. The method includes impeding the relative movement between the sleeve and the plug by the plug position control mechanism to maintain the plug connected to the autonomous vehicle, and enabling the relative movement between the sleeve and plug by the plug position control mechanism, and moving the sleeve and plug in opposite relative directions to a second relative orientation and thereby disconnect the plug from the trailer.

In some aspects, the method may include impeding movement of the plug via at least one plug position control mechanism; enabling movement of the plug via the at least one plug position control mechanism; triggering each of the at least one plug position control mechanisms; contacting a corresponding at least one plate by each of the at least one plug position control mechanisms to drive a first open end of the sleeve in a direction a predetermined distance, wherein each of the at least one plates extends from an inner wall of the sleeve and is located in a corresponding at least one pocket, each of the at least one plates being slidable through the associated pocket; contacting a corresponding at least one distal end of a corresponding at least one pocket by each of the at least one plug position control mechanisms to drive the plug in an opposing direction a predetermined distance; and moving the plug from the connected position to the disconnected position. Each of the at least one plug position control mechanisms are housed in a corresponding at least one pocket, each of the at least one pockets being located along the plug body.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Other features will become apparent from the following detailed description considered in conjunction with the accompanying drawings. It is to be understood, however, that the drawings are designed as an illustration only and not as a definition of the limits of the embodiment of the disclosure.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

The present disclosure relates to systems and methods for connecting and disconnecting appendages in a vehicle, such as an autonomous vehicle and such appendages may comprise electric cables, connected between a tractor, i.e. vehicle, and trailer, as described in detail below in connection with FIGS. 6-8.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

As described herein, an appendage disconnection system for disconnecting an appendage, such as an electric cable, of a vehicle from a trailer after a trigger event. The trigger event may including, but not limited to, when a sensor of the vehicle and/or trailer, described below, detects an emergency situation, when a certain event occurs—for example when the vehicle arrives at its destination, or when the system is manually triggered by an operator. The appendage disconnection system includes a disconnection device and is in electrical communication with the sensors of the vehicle and/or sensors of the trailer. The sensors monitors the status of the vehicle and the trailer and sends disconnection instructions to the disconnection device when a trigger event is detected, for example be an emergency situation, arrival at a predetermined location, or an operator sending disconnection instructions to the control system of the vehicle.

Various embodiments of the sensors of the vehicle and trailer in the present disclosure are described with reference to FIGS. 1-5 below.

Figure 1:
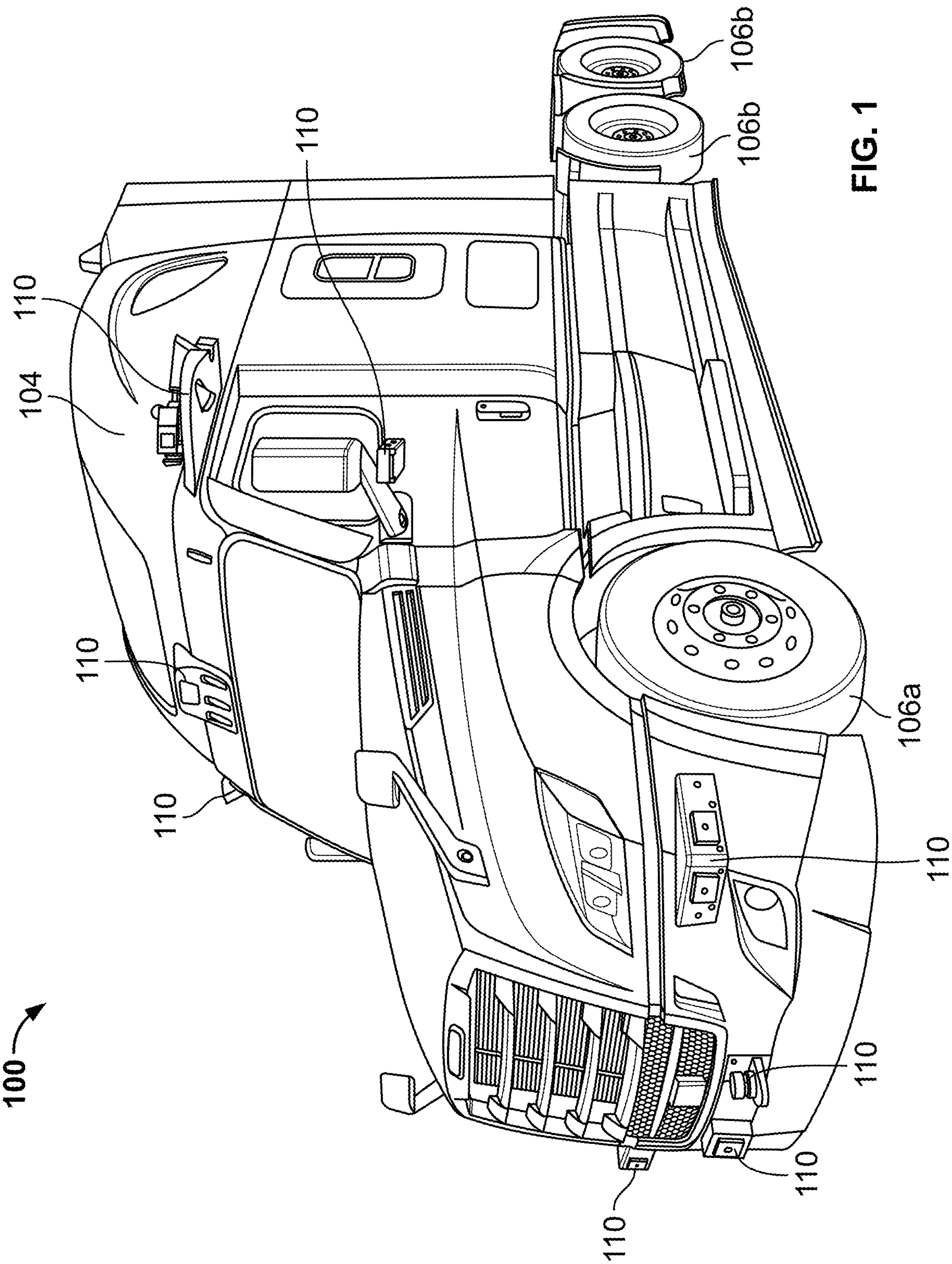
FIG. 1 is a perspective view of a vehicle of the present disclosure.
Figure 2:
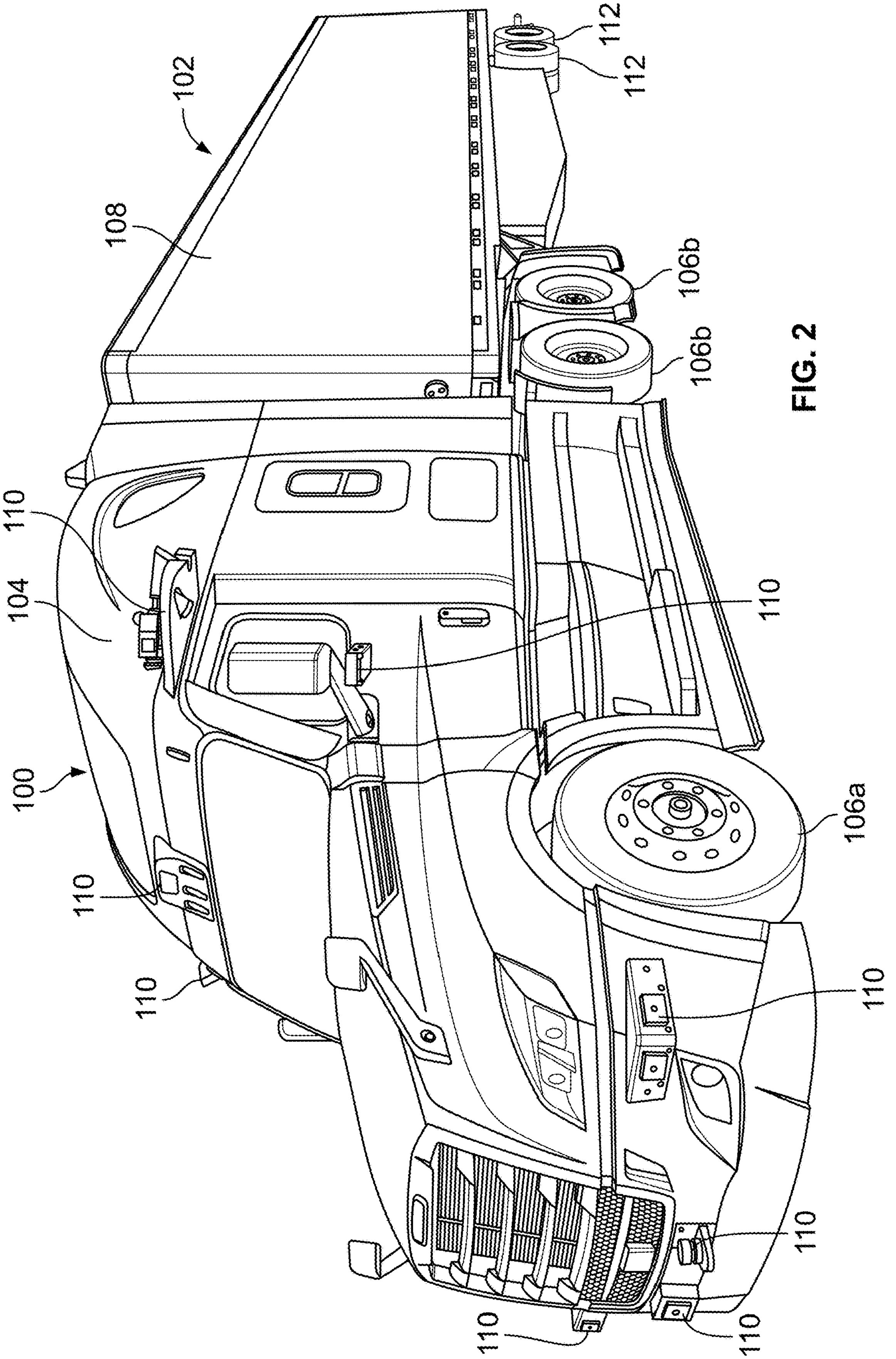
FIG. 2 is a perspective view of the vehicle of FIG. 1 with a trailer attached thereto.
Figure 3:
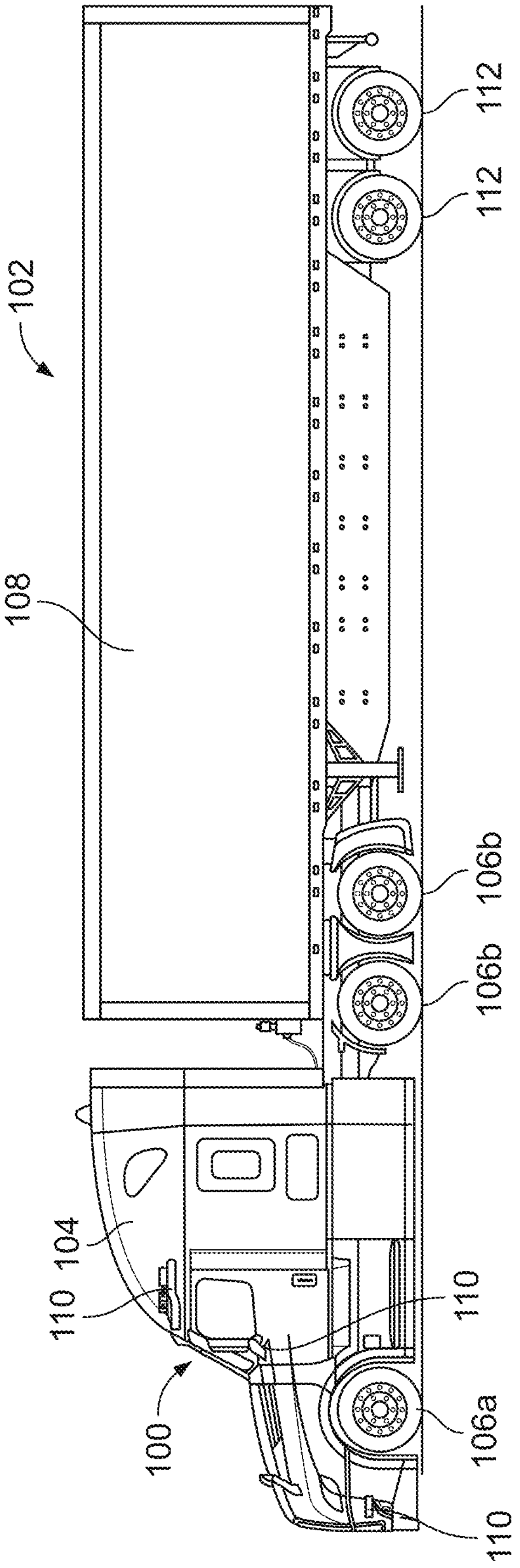
FIG. 3 is a side view of the vehicle with attached trailer of FIG. 2.

FIG. 1 is a perspective view of a vehicle 100, such as a truck that may be conventionally connected to a single or tandem trailer 102 to transport the trailer 102 to a desired location, as shown in FIGS. 2 and 3, which are, respectively, perspective and side views of the vehicle 100 of FIG. 1 with the trailer 102 attached thereto. The vehicle 100 includes a cabin 104 that can be supported, and steered in the required direction, by front wheels **106*a* and rear wheels 106*b* that are partially shown in FIG. 1. The front wheels 106*a* are positioned by a steering system that includes a steering wheel and a steering column (not shown). The steering wheel and the steering column may be located in the interior of cabin 104**.

The vehicle 100 may be an autonomous vehicle, in which case the vehicle 100 may omit the steering wheel and the steering column to steer the vehicle 100. Rather, the vehicle 100 may be operated by an autonomy computing system of the vehicle 100 based on data collected by a sensor network including one or more sensors, e.g., sensors 110 shown in FIGS. 1-3. The vehicle 100 may additionally include a fifth-wheel coupling (not shown) to which the trailer 102 can be releasably attached. The trailer 102 can include a storage container 108 and a plurality of rear wheels 112 that support the storage container 108. It should be understood that in some embodiments the vehicle 100 and the trailer 102 can be a permanently attached as a single unit.

Similar sensors can be used around the perimeter of the vehicle 100 to ensure full environmental coverage around the vehicle 100 is provided by the sensors. In some embodiments, the vehicle 100 can include, e.g., 5-6 LIDAR sensors, 8-10 cameras, combinations thereof, or the like. In some embodiments, the vehicle 100 can tow a trailer and the trailer can similarly include LIDAR sensors and/or cameras to provide field-of-view coverage around the perimeter of the vehicle 100 and the trailer and monitor the status of the trailer. The environmental coverage by the sensors and/or cameras therefore provides data corresponding with the front, rear, sides and corners of the vehicle 100 and the trailer hauled by the vehicle 100.

Figure 4:
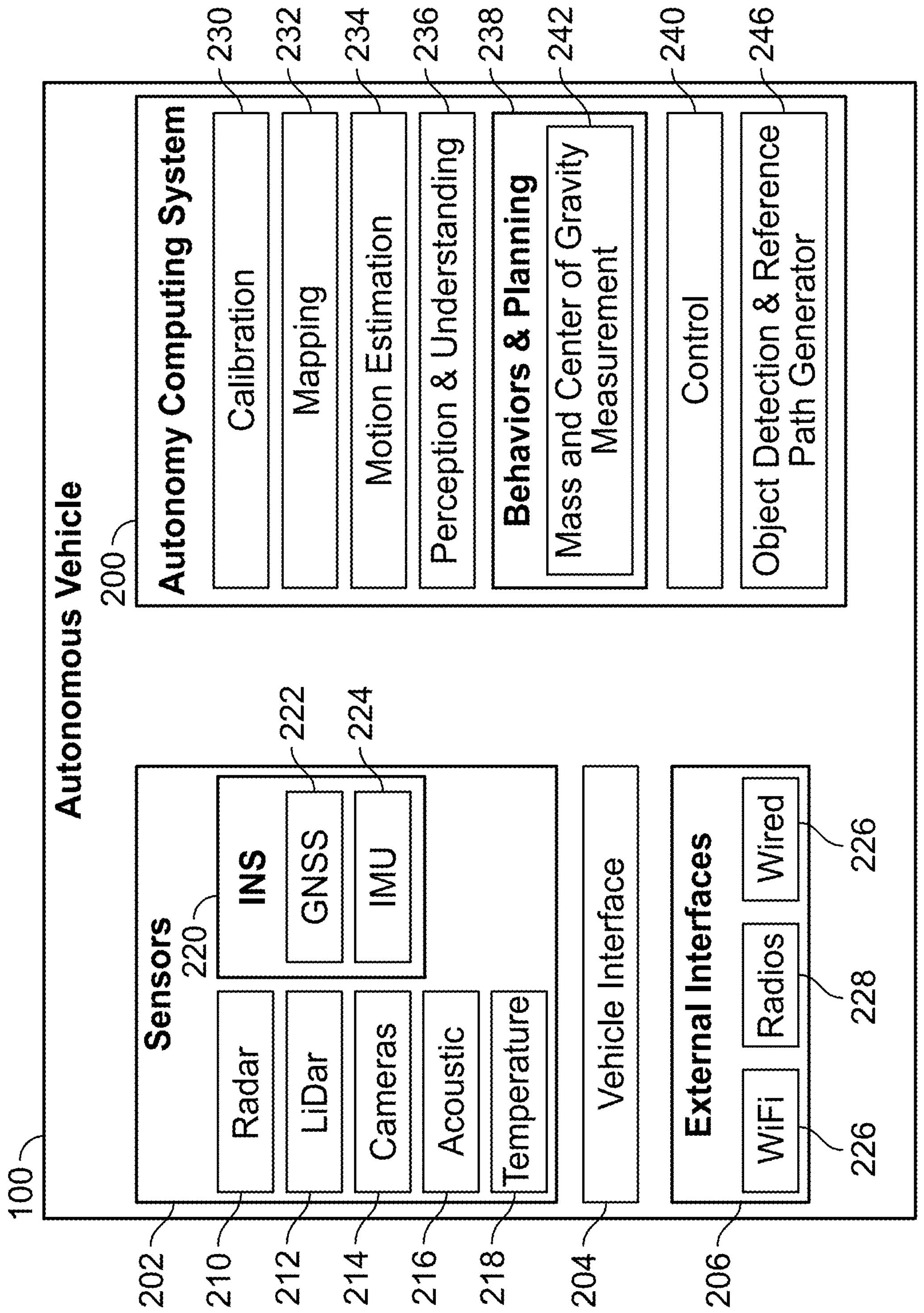
FIG. 4 is a block diagram of the autonomous truck shown in FIG. 1.

FIG. 4 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100, of the trailer 102, and its proximity. As described in further detail below, these signals may be used by autonomy computing system 200 to determine how to control operations of autonomous vehicle 100.

Cameras 214 are configured to capture images of the environment surrounding the autonomous vehicle 100 in any aspect or field of view (FOV). The FOV can have any angle or aspect such that images of the areas ahead of, to the side, behind, above, or below the autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers in the environment surrounding autonomous vehicle 100. In some embodiments, the image data generated by cameras 214 may be sent to autonomy computing system 200 or other aspects of autonomous vehicle 100 for one or more of identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both, including disconnecting the appendage system.

In some embodiments, the image data generated by cameras 214 may be transmitted to mission control for one or more of identifying one or more construction markers (or nodes), generating one or more connectivity graphs based upon identified construction markers (or nodes), updating a reference path based upon the one or more connectivity graphs, transmitting the updated reference path to the autonomy vehicle 100 for guiding autonomous vehicle 100 to drive on the updated reference path.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize the autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, the autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electro-mechanical-systems (MEMS) device that measures and reports one or more features regarding the motion of the autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of the autonomous vehicle 100. In some embodiments, the trailer associated with the vehicle 100 can include similar sensors 202 for gathering similar data associated with the trailer, thereby further assisting with control operations of the autonomous vehicle 100 and the appendage disconnection system 400.

In the example embodiment, autonomy computing system 200 employs vehicle interface 204 to send commands to the various aspects of autonomous vehicle 100 that actually control the motion of the autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a mass and center of gravity measurement module 242, a control module or controller 240, and an object detection and reference path generator module 246. The object detection and reference path generator module 246, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The object detection and reference path generator module 246 may perform one or more tasks including, but not limited to, identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term “autonomous” includes both fully autonomous and semi-autonomous.

Figure 5:
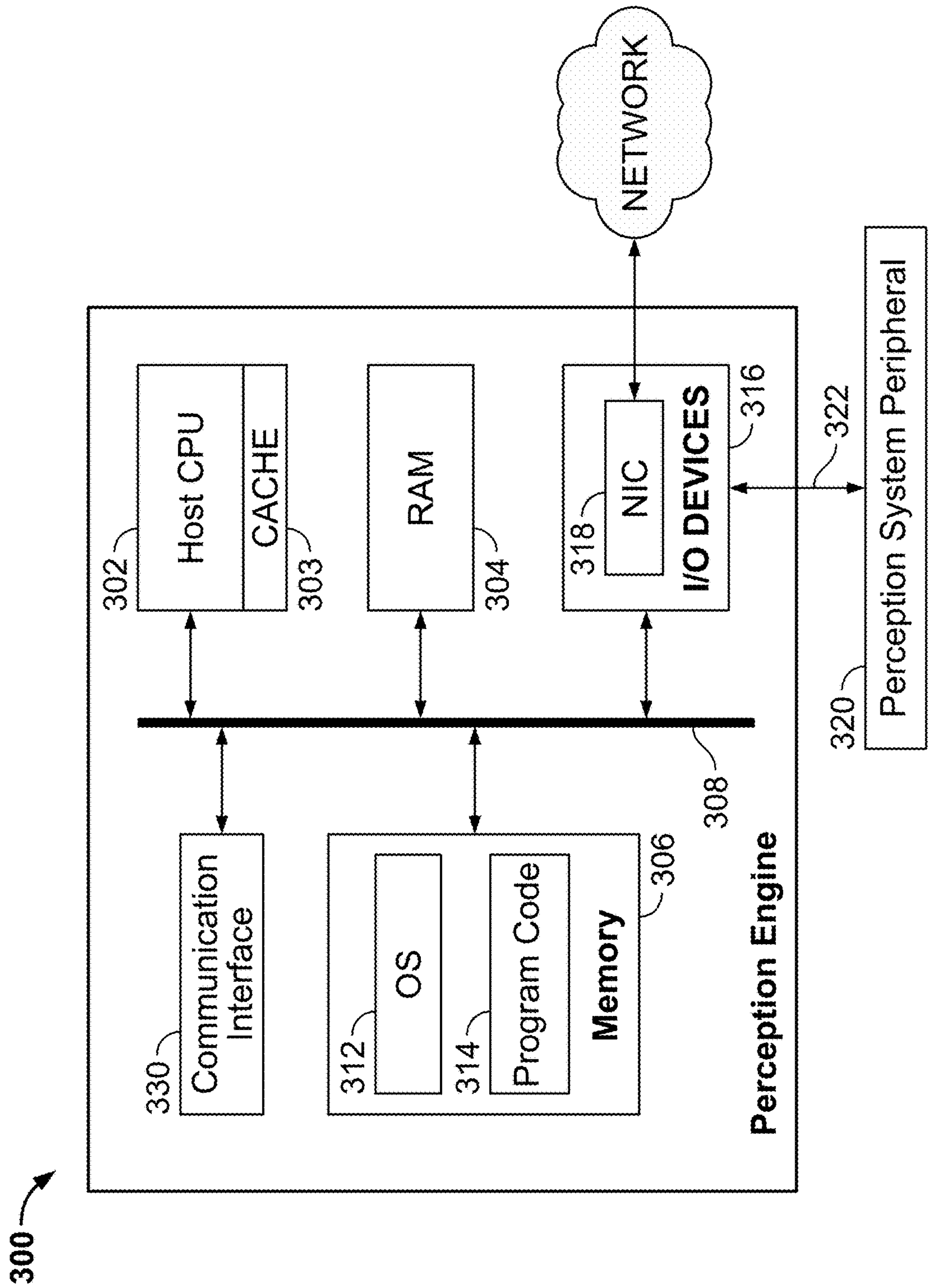
FIG. 5 is a block diagram of an example computing system.

FIG. 5 is a block diagram of an example computing system 300, such as the autonomy computing system 200 shown in FIG. 2, configured for sensing an environment in which an autonomous vehicle is positioned. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 2. In alternative embodiments, one or more sections of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface such as a network interface controller (NIC) 318, or a peripheral interface for communicating with a perception system peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, or a CAN bus controller for communicating over a CAN bus.

Figure 6:
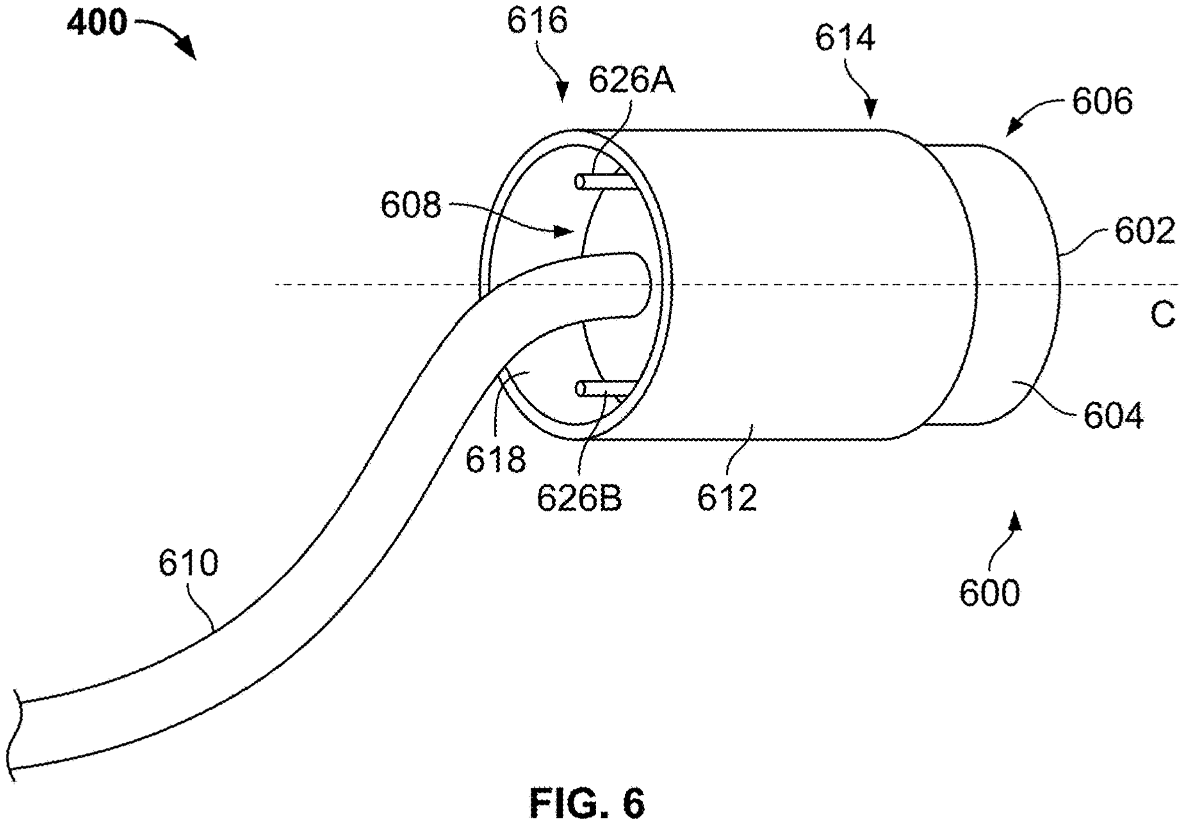
FIG. 6 is a side view of an appendage disconnection system in accordance with an embodiment.
Figure 7A:
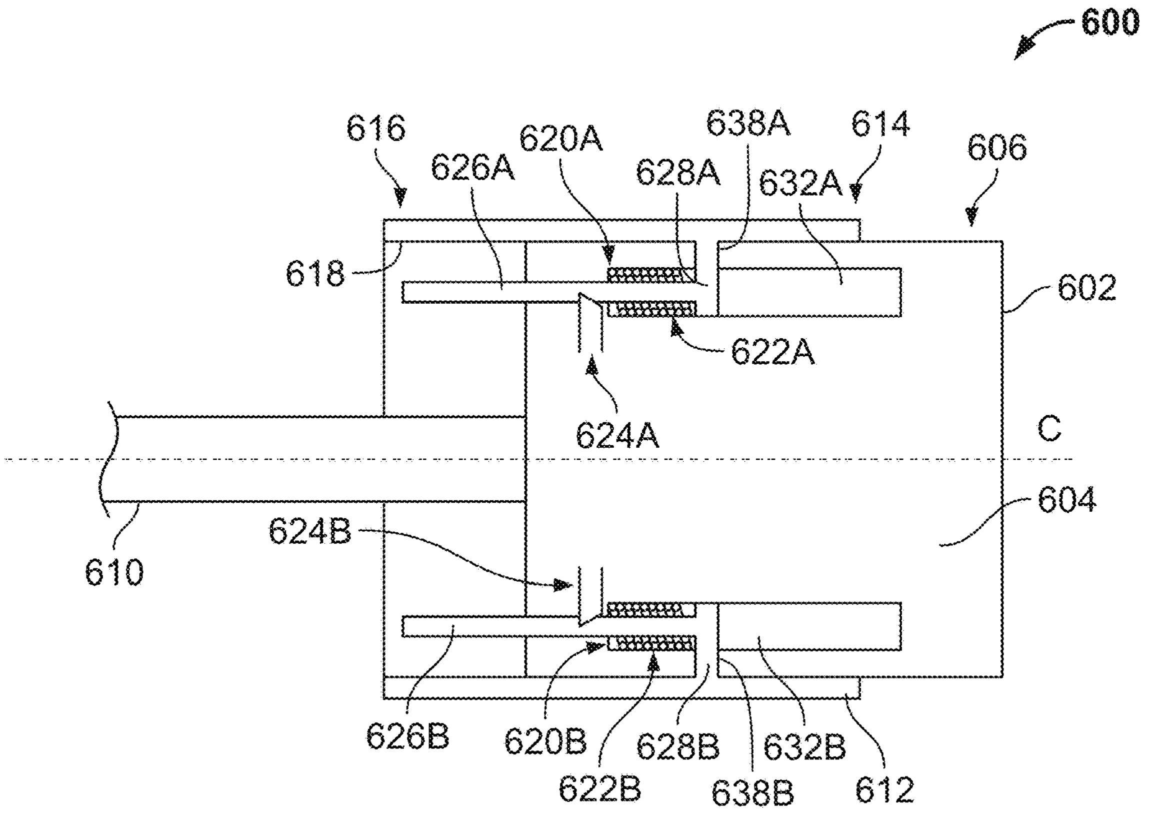
FIGS. 7A and 7B are side views of the appendage disconnection system of FIG. 6 in a connected position and disconnected position.
Figure 7B:
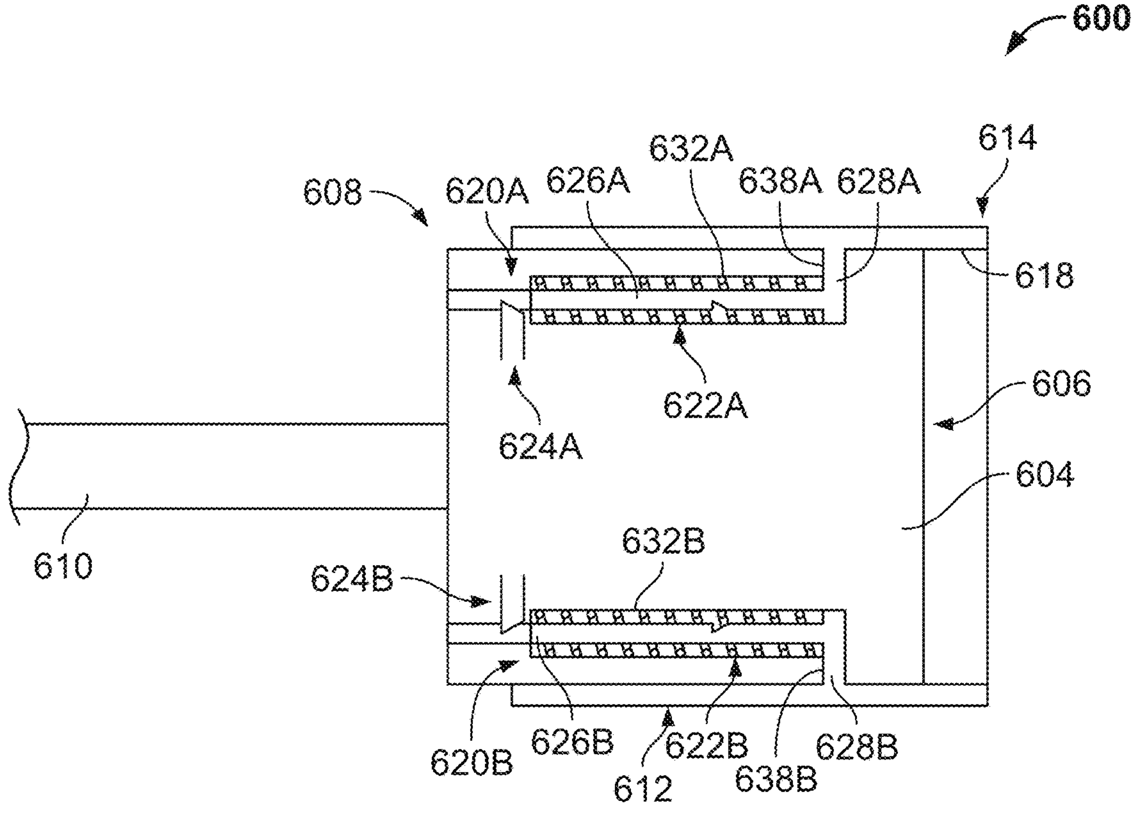
Figure 7C:
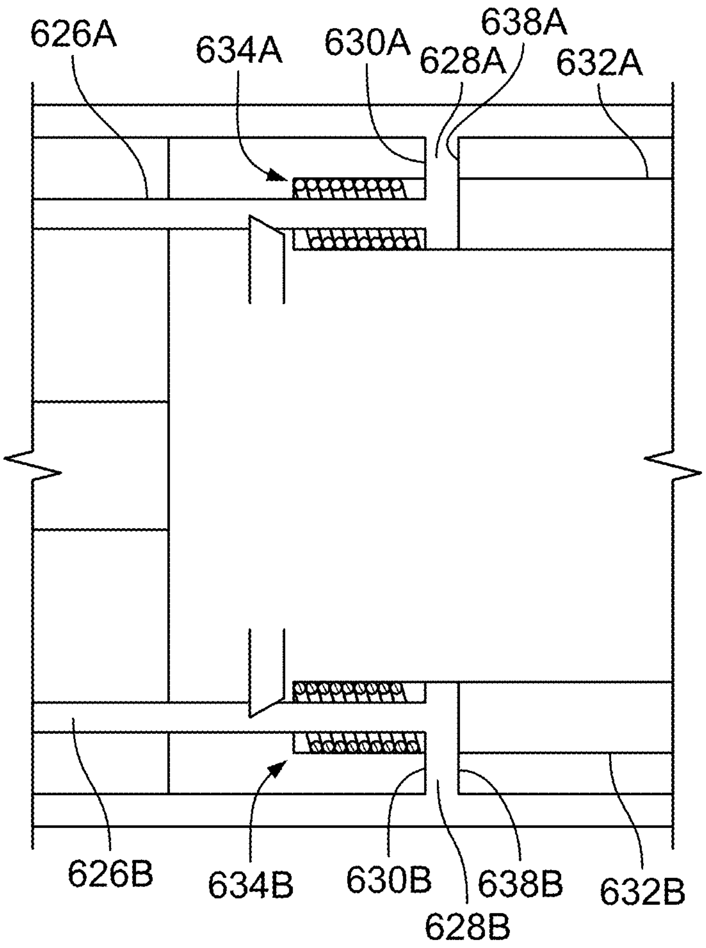
FIG. 7C is an enlarged side view of the appendage disconnection system of FIG. 7A.

Referring to FIGS. 6-7C an embodiment is shown of an appendage disconnection system 400. In this embodiment, the appendage disconnection system 400 is an electric cable disconnection system. The appendage disconnection system 400 includes a disconnecting device 600 and is in communication with the sensors 202 of the vehicle 100 and the sensors of the trailer 102. The disconnecting device 600 includes a plug 602 connected to a cable 610, a sleeve 612 encasing the plug 602, a plug position control mechanism 620 positioned within the plug 602, and a sensor (not shown) positioned within the plug 602 and electrically coupled to the plug position control mechanism 620. The plug 602 connects to a wall of the trailer 102 and the cable 610 connects to the vehicle 100 such that power is provided to the trailer 102 from the vehicle 100 via the cable 610 and plug 602. The sensor 202 monitors the plug's 602 connection to the trailer 102. If the sensor detects an improper connection such that the plug 602 may become disconnected, a warning is sent to the autonomy computing system 200. The plug 602 includes a plug body 604 that is substantially cylindrical. The sleeve 612 has a shape corresponding to the shape of the plug body 604. In some embodiments in addition to the cylindrical shape disclosed, the plug body 604 and the sleeve 612 may have a square or rounded square shape. The sleeve 612 is hollow and has a first open end and a second open end. The plug position control mechanism 620, is positioned within the plug body 604 and is configured to impede and enable movement of the sleeve 612 relative to the plug body 604 as the plug 602 is moved from a connected position to a disconnected position.

Referring to FIG. 7A, when the truck (autonomous or manual) is operational, i.e. the vehicle 100 and trailer 102 are connected and being driven, the plug 602 is in the connected position. In the connected position, the plug 602 is inserted into a corresponding port in the trailer 102 (not shown) and the plug body 604 is partially projected out of the sleeve 612, see FIG. 7A. The plug body 604 may project a distance beyond a proximal end 614 of the sleeve 612 ⅛-¼ inches, ¼-½ inches, ½-¾ inches, ⅛-½ inches, ⅛-¾ inches, or ¼-¾ inches, inclusive, out of the proximal end 614 of the sleeve 612, the proximal end 614 being open. It should be noted that the sleeve 612 extends away from the trailer in the connected position where the plug body 604 is connected to the trailer and partially projects out of the proximal end 614 of the sleeve 612, thereby separating the sleeve 612 from the trailer. The sleeve 612 includes at least one post 626 adapted to operably couples the sleeve 612 to the plug body 604.

The at least one post 626 extends from a corresponding plate 628 and through a corresponding at least one pocket 632. The at least one pocket 632 is provided in the plug body 604. The plug body 604 includes at least one pocket 632 formed within the plug body 604 and near or close to an exterior surface 804 of the plug body 604. The at least one plate 628 extends radially, inwardly from an inner wall 618 of the sleeve 612 into the plug body 604 through a corresponding at least one notch provided in the plug body 604 and into the at least one pocket 632. The at least one notch 638 is adjacent to the at least one pocket 632, and in communication with the pocket 632, enabling the plate 628 to be partially located in the pocket 632. The at least one post 626 extends in a longitudinal direction relative to the plug body 604 and sleeve 612. The at least one post 626 extends through the plug body 604. The at least one post 626 extends longitudinally, substantially parallel to a central longitudinal axis C of the plug body 604. The at least one plate 628 may slide freely in a longitudinal direction, within the corresponding notch 638 and the at least one post 626 may slide freely in a longitudinal direction within the corresponding pocket 632 as the sleeve 612 slides relative to the plug body 604. In some embodiments, the sleeve 612 may include a first post 626A and a second post 626B that extend from a first plate 628A and a second plate 628B. The plug body 604 includes a radially oriented first notch 638A in communication with a first pocket 632A and a radially oriented second notch 638B in communication with a second pocket 632B, as shown in FIGS. 7A and 7B. In some embodiments, the sleeve 612 may include any number of plates and posts and associated notches and pockets to receive the respective plates and posts required to enable the disconnection of appendages in an autonomous vehicle.

The first notch 638 and associated proximate first pocket 632A form a first notch and pocket pair and the second notch 638 and associated proximate second pocket 632B form a second notch and pocket pair. The first plate 628A and first post 626A extending therefrom form a first plate and post pair and the second plate 628B and second post 626B extending therefrom form a second plate and post pair. In some embodiments, the first and second notch and pocket pairs are located on opposing sides of the plug body 604, thereby being diametrically opposed. In some embodiments, the first and second plate and post pairs are located on opposing sides of the sleeve 612, thereby being diametrically opposed. The first plate and second plate 628A ,628B extend from opposing sides of the inner wall 618 of the sleeve 612 through the respective first notch 638A and second notch 638B into the respective first pocket 632A and the second pocket 632B. The first notch and pocket pair and the first plate and post pair are located on the same side of the disconnecting device 600 and the second notch and pocket pair and the second plate and post pair are location on the same side of the disconnecting device 600. The first notch and pocket pair and the first plate and post pair are located on a side or end of the disconnecting device 600 that is opposite to the side/end of the disconnecting device that includes the second notch and pocket pair and second plate. In this instance they are diametrically opposed.

The first post 626A and the second post 626B extend from a bottom side 630A, 630B of the first plate 628A and the second plate 628B through the first pocket 632A and the second pocket 632B toward a distal end 634A, 634B of the first and the second pocket 632A, 632B, respectively (see FIG. 7C). The first pocket 632A and the second pocket 632B may include a pass-through hole on the distal end 634A, 634B of the first and second pocket 632A, 632B, respectively, such that the first post and the second post 626A, 626B may extend out of the first pocket and the second pocket 632A, 632B, respectively, when the plug 602 is in the connected position (FIG. 7A). In some embodiments, the first post and the second post 626A, 626B extend and terminate substantially proximate to the distal end 616 of the sleeve 612, as shown in FIGS. 7A and 7B, the distal end 616 of the sleeve 612 being opposite of the proximal end 614 and open. In some embodiments, the first post and the second post 626A, 626B may extend beyond the distal end 608 of the plug body 604 but not to the edge of the distal end 616 of the sleeve 612.

The plug position control mechanism 620 may be positioned within a corresponding pocket. In some embodiments, the disconnecting device 600 may include a first and second plug position control mechanism 620A, 620B positioned within or adjacent to the first pocket 632A and the second pocket 632B, respectively, as shown in FIGS. 7A and 7B. The first and the second plug position control mechanism 620A, 620B is operably coupled to the first plate and post pair and the second plate and post pair, respectively. In some embodiments, the plug position control mechanism 620 is a biasing mechanism 622, such as a spring, and includes a latch 624. A first biasing mechanism 622A and a second biasing mechanism 622B is coiled around the first post 626A and the second post 626B, respectively. In the connected positioned, the first biasing member 622A and the second biasing member 622B are compressed (See FIG. 7A. A first latch 624A and a second latch 624B retain first and the second biasing members 622A, 622B in a compressed position, respectively. When the first and the second biasing member 622A, 622B are compressed, and prior to release of the first latch and the second latch 624A, 624B, the first and the second plug position control mechanism 620A, 620B prevents movement of the plug 602, thereby maintaining the plug 602 in the connected position. Upon activation of the first and the second plug control mechanisms 620A, 620B, the first latch 624A and the second latch 624B are retracted toward the central longitudinal axis C of the disconnecting device 600, thereby releasing the first and the second biasing mechanism 622A, 622B. When the latches are retracted, the first biasing member 622A and the second biasing member 622B extends causing the plug 602 to move along axis C toward the distal end 616. In some embodiments, the first latch 624A and the second latch 624B can be retracted by a motor. The first and the second latch 624A, 624B may be mechanically triggered or electrically triggered. In some embodiments, the first latch 624A and the second latch 624B is can be retracted by a solenoid. In this embodiment, the latch is retracted by providing power to the solenoid. The power can be provided through the cable 610 or through a separate cable.

When the sensors 202 of the vehicle 100 and/or the sensors of the trailer 102 detects an emergency situation, instructions are sent to the disconnection device 600, for example from the autonomy computing system 200, to disconnect the plug 602 from the trailer 102. Upon receiving the disconnection instructions, the plug control mechanism is activated and the plug 602 translates along axis C to a disconnected position (FIG. 7B). In autonomous-trucks, pull-over procedures may be initiated prior to the plug control mechanism being activated and the plug 602 translating to the disconnected position.

Referring to FIG. 7B, in the disconnected position, the plug body 604 projects out of the distal end 616 of the sleeve 612. In some embodiments, the plug body 604 may project out of the distal end 616 in the disconnected position the same distance the plug body 604 projects out of the proximal end 614 of the sleeve 612 in the connected position, for example ⅛-¼ inch, ¼-½ inch, ½-¾, ⅛-½, ⅛-¾, or ¼-¾ inch, inclusive. A proximal end 606 of the plug body 604 is retracted within the sleeve 612 the same distance the distal end 616 of the plug projects out of the distal end 616 of the sleeve, in the disconnected position. In some embodiments, the plug body 604 may project out of the distal end 616 in the disconnected position a distance greater than the distance the plug body 604 projects out of the proximal end 614 in the connected position. In some embodiments, the plug body 604 may project out of the distal end 616 in the disconnected position a distance less than the distance the plug body 604 projects out of the proximal end 614 in the connected position. In this embodiment, the distance proximal end 606 of the plug body 604 is retracted within the sleeve 612 and the distance the plug body 604 projects out of the distal end 616 is equal to the distance the plug body 604 projects out of the proximal end 614 in the connected position. The sleeve 612 is slideable relative to the plug body 604 such that the first and second plug position control mechanism 620A, 620B translates the sleeve 612 towards the trailer a predetermined distance. In some embodiments, the sleeve 612 is translated forward to make contact with the wall of the trailer. In some embodiments, the sleeve 612 is translated forward a predetermined distance where the proximal end 614 of the sleeve does not translate pass the proximal end 606 of the plug body 604.

The first and the second biasing mechanism 622A, 622B expands, contacting the first plate 628A and the second plate 628B, respectively. The first and the second biasing mechanism 622A, 622B urges the first plate 628A and the second plate 628B toward a proximal end 636A, 636B of the first pocket and the second pocket 632A, 632B until the first plate 628A and the second plate 628B contact the proximal end 636A, 636B. The first plate 628 and the second plate 628 slides within the first notch 638 and the second notch 638 as the first plate 628 and the second plate 628 are driven forward. The first plate 628 and the second plate 628 contact the proximal end 636A, 636B and the sleeve 612 contacts the trailer simultaneously. In some embodiments, the first and the second biasing member 622A, 622B is not yet in a fully uncompressed state and continues to expand. The first and the second biasing member 622A, 622B may contact the distal end 634A, 634B of the first pocket 632A and the second pocket 632B to drive the plug body 604 away from the trailer, placing the plug 602 in the disconnected position.

Thus the disconnecting device 600 is removed from the trailer and the vehicle is able to move away from the trailer.

In an alternative embodiment, the plug position control mechanism is a servo motor. A first and a second servo motor is operably coupled to the first plate and post pair and the second plate and post pair. When the sensors 202 of the vehicle 100 and/or the sensors of the trailer 102 detects an emergency situation, the first and the second servo motor is activated and drives the first plate 628A and the second plate 628B toward the proximal end 636A, 636B of the first pocket 632A and the second pocket 632B until the first plate 628A and the second plate 628B contact the proximal end 636A, 636B to translate the sleeve 612 toward the trailer 102 and move the plug 602 to the disconnected position as described above.

In an alternative embodiment, the plug position control mechanism is an actuator. A first and a second actuator is operably coupled to the first plate and post pair and the second plate and post pair. When the sensors 202 of the vehicle 100 and/or the sensors of the trailer 102 detects an emergency situation, the first and the second actuator is activated and drives the first plate 628A and the second plate 628B toward the proximal end 636A, 636B of the first pocket 632A and the second pocket 632B until the first plate 628A and the second plate 628B contact the proximal end 636A, 636B to translate the sleeve 612 toward the trailer 102 and move the plug 602 to the disconnected position as described above.

As stated above, the disconnecting device 600 may be disconnected from the trailer 102 in non-emergency situation, such as when the vehicle arrives at a specified destination. The GNSS receiver 222 may be in electrical communication with the sensors of the trailer 102 such that when the vehicle 100 arrives a specified destination, the plug position control mechanism 620 may be triggered and the plug 602 is translated to the disconnected positioned as described above. Additionally, the disconnecting device 600 may also be disconnected from the trailer 102 in non-emergency situation, such as by an operator sending a wireless signal including instructions to disconnect. For example, the wireless signal containing instructions may be sent to the autonomy computing system 200 which then may be sent to the disconnecting device 600, from the autonomy computing system 200. The wireless signal may be sent from inside the vehicle 100 or may be located at a control hub.

Figure 8:
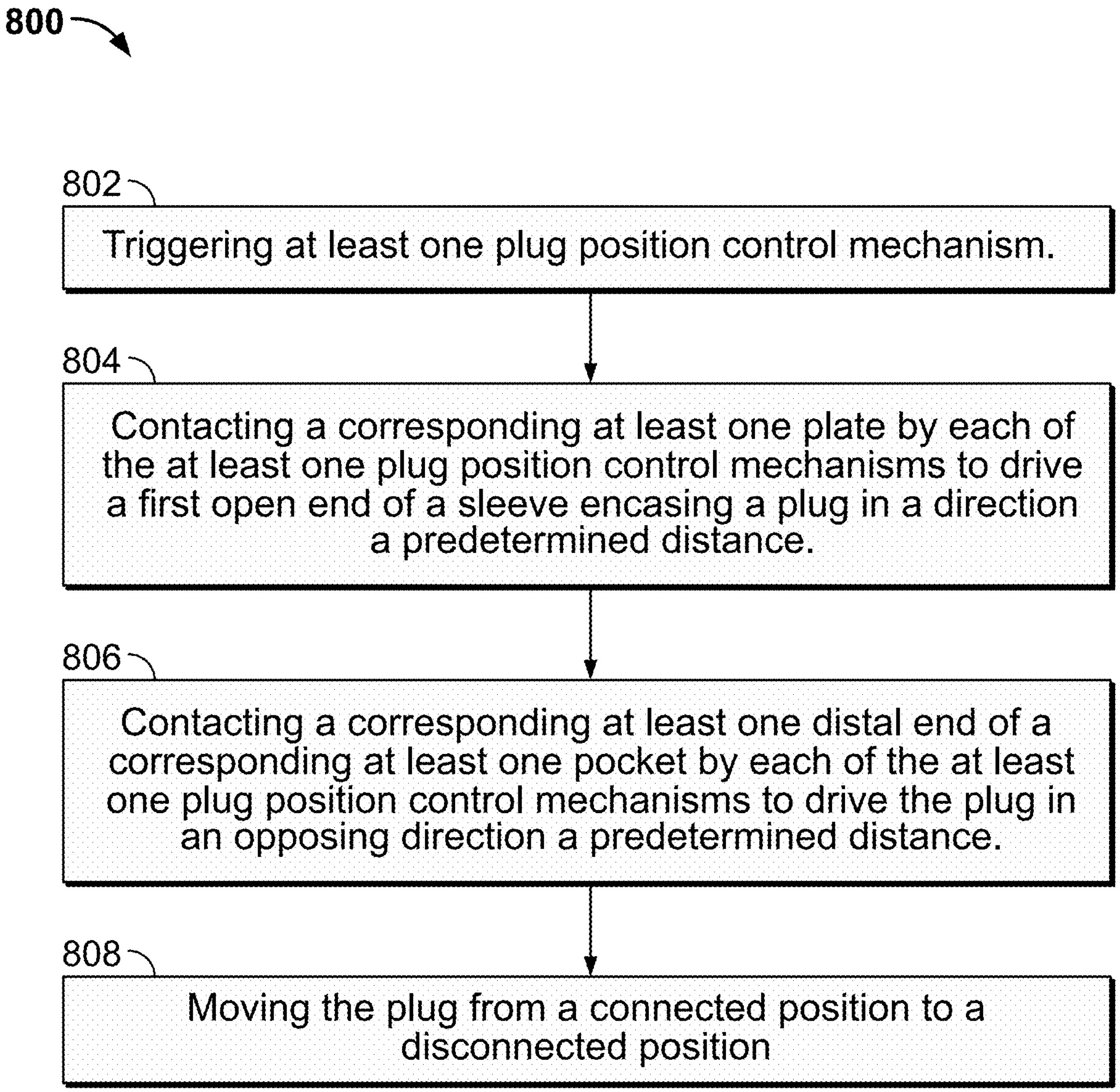
FIG. 8 is a flowchart depicting an example method of disconnecting the appendage disconnection system in accordance with an embodiment.

FIG. 8 is a flowchart depicting an example method 800 of disconnecting the appendance disconnection system in accordance with some embodiments.

In 802, the method 800 may include triggering at least one plug position control mechanism. The at least one plug position control mechanism may be one of the exemplary plug position control mechanisms discussed herein (e.g. the first plug position control mechanism 620A and the second plug position control mechanism 620B). The plug position control mechanism is configured to impede relative movement between the exemplary sleeve and plug discussed herein (e.g. sleeve 612 and plug 602). The plug position control mechanism impedes relative movement to maintain the plug and sleeve in a first relative orientation where the plug is connected to a trailer, the trailer being selectively coupled to an autonomous vehicle. The plug position control mechanism is further configured to enable relative movement of the plug and sleeve in opposite directions to assume a second relative orientation where the plug is disconnected from the autonomous vehicle.

In 804, the method 800 may include contacting a corresponding at least one plate by each of the at least one plug position control mechanisms to urge a first open end of a sleeve encasing a plug in a direction a predetermined distance. The at least one plate may be one of the exemplary plates discussed herein (e.g. first plate 628A and the second plate 628B). Each of the at least one plates extends from an inner wall of the sleeve and is located in a corresponding at least one pocket. The at least one pocket may be one of the exemplary pockets discussed herein (e.g. the first pocket 632A and the second pocket 632B). Each of the at least one plates are configured to be slidable through the associated pocket.

In 806, the method 800 may include contacting a corresponding at least one distal end of a corresponding at least one pocket by each of the at least one plug position control mechanisms to urge the plug in an opposing direction a predetermined distance. Each of the at least one plug position control mechanisms are housed in a corresponding at least one pocket. Each of the at least one pockets are located along the plug body.

In 808, the method 800 may include moving the plug from a connected position to a disconnected position. In the connected position, the plug is connected to a trailer portion. In the disconnected position, the plug is removed from the trailer portion.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for disconnecting a cable from an autonomous vehicle, wherein the autonomous vehicle is selectively coupled to a trailer, the system comprising:

a plug located along the cable, the plug being connected to the trailer, the plug having a body and at least one pocket, each at least one pocket being located within the plug body;

a sleeve encasing the plug, the plug being movable relative to the sleeve between a connected position where the plug is connected to the trailer and a disconnected position where the plug is disconnected from the trailer, the sleeve is slidable relative to the plug, and the sleeve comprises an inner wall and at least one plate; and a plug position control mechanism mounted with respect to the plug and configured to impede movement of the plug to maintain the plug in the connected position and to enable movement of the plug to the disconnected position, wherein each of the at least one plate extends from the inner wall and is located in a corresponding at least one pocket, each of the at least one plate being slidable within the associated pocket.

2. The system for disconnecting a cable from an autonomous vehicle of claim 1, wherein the plug comprises two pockets.

3. The system for disconnecting a cable from an autonomous vehicle of claim 2, wherein the plug body is substantially cylindrical and comprises a diameter, pockets are located along opposite sides of the plug being diametrically opposed.

4. The system for disconnecting a cable from an autonomous vehicle of claim 1, wherein the plug further comprises at least one notch, each at least one notch being located along an exterior surface of the plug body and adjacent a corresponding at least one pocket.

5. The system for disconnecting a cable from an autonomous vehicle of claim 4, wherein the plug comprises a first notch and a second notch and a first pocket and a second pocket, the first notch and first pocket forming a first notch and pocket pair and the second notch and second pocket forming a second notch and pocket pair.

6. The system for disconnecting a cable from an autonomous vehicle of claim 1, wherein the sleeve comprises two plates, the two plates located on opposite sides of the sleeve.

7. The system for disconnecting a cable from an autonomous vehicle of claim 1, wherein the sleeve further comprises at least one post extending from a corresponding at least one plate.

8. The system for disconnecting a cable from an autonomous vehicle of claim 1, wherein the plug position control mechanism is configured to maintain relative positions of the sleeve and the plug substantially constant when the plug is connected to the trailer, and wherein the plug position control mechanism is configured to enable a relative, opposed motion between the sleeve and plug when the plug is disconnected from the trailer.

9. The system for disconnecting a cable from an autonomous vehicle of claim 1, wherein the plug includes the plug position control mechanism housed in the corresponding at least one pocket and is operably coupled to a corresponding at least one plate located in the corresponding at least one pocket.

10. The system for disconnecting a cable from an autonomous vehicle of claim 1, wherein the plug position control mechanism further comprises a biasing mechanism and a release mechanism configured to release the biasing mechanism to enable movement of the plug.

11. The system for disconnecting a cable from an autonomous vehicle of claim 10, wherein the release mechanism is a latch.

12. A disconnecting device comprising:

a connecting member having a body and at least one pocket, each of the at least one pockets being located along the connecting member body;

a sleeve encasing the connecting member, the connecting member and sleeve being movable relative to each other, the sleeve comprising an inner wall and at least one plate; and a position control mechanism mounted with respect to the connecting member and configured to impede relative movement between the sleeve and the connecting member to maintain the connecting member and sleeve in a first relative orientation, and to enable relative movement of the connecting member and sleeve in opposite directions to assume a second orientation, wherein each of the at least one plate extends from the inner wall and is located in a corresponding at least one pocket, each of the at least one plate being slidable within the associated pocket.

13. The disconnecting device of claim 12, wherein the connecting member is a plug.

14. The disconnecting device of claim 12, wherein the position control mechanism further comprises a biasing mechanism and a release mechanism configured to release the biasing mechanism to enable movement of the connecting member and sleeve, wherein the position control mechanism is configured to maintain relative positions of the sleeve and connecting member substantially constant, and to enable a relative, opposed motion between the sleeve and the connecting member.

15. The disconnecting device of claim 12, wherein the connecting member includes at least one position control mechanism housed in the corresponding at least one pocket and is operably coupled to a corresponding at least one plate located in the corresponding at least one pocket.

16. A method of disconnecting a connecting system from an autonomous vehicle, wherein the autonomous vehicle is selectively coupled to a trailer, where the connecting system includes a plug, the plug having a body and at least one pocket, each at least one pocket being located within the plug body, a sleeve encasing the plug, the plug and sleeve being movable relative to each other, the sleeve is slidable relative to the plug, and the sleeve includes an inner wall and at least one plate, each of the at least one plate extends from the inner wall and is located in a corresponding at least one pocket, each of the at least one plate being slidable within the associated pocket, and a plug position control mechanism mounted with respect to the plug and configured to impede relative movement between the sleeve and the plug to maintain the plug and sleeve in a first relative orientation where the plug is connected to the trailer, and to enable relative movement of the plug and sleeve in opposite directions to assume a second relative orientation where the plug is disconnected from the trailer, the method comprising:

impeding the relative movement between the sleeve and the plug by the plug position control mechanism to maintain the plug connected to the trailer, enabling the relative movement between the sleeve and plug by the plug position control mechanism, and moving the sleeve and plug in opposite relative directions to a second relative orientation and thereby disconnect the plug from the trailer.

17. The method of claim 16, further comprising;

impeding movement of the plug via the plug position control mechanism;

enabling movement of the plug via the plug position control mechanism;

triggering the plug position control mechanism;

contacting a corresponding at least one plate by the plug position control mechanism to urge a first open end of the sleeve in a direction a predetermined distance, wherein each of the at least one plates extends from an inner wall of the sleeve and is located in a corresponding at least one pocket, each of the at least one plates being slidable through the associated pocket;

contacting a corresponding at least one distal end of a corresponding at least one pocket by the plug position control mechanism to urge the plug in an opposing direction a predetermined distance; and moving the plug from the connected position to the disconnected position.

* * * * *